United States Patent [19]
Boettcher

[11] Patent Number: 5,522,530
[45] Date of Patent: Jun. 4, 1996

[54] HAND TRUCK SENTRY SYSTEM

[76] Inventor: Carl A. Boettcher, R.R. #4 Box 4789 A, Moscow, Pa. 18444

[21] Appl. No.: 233,675

[22] Filed: Apr. 26, 1994

[51] Int. Cl.⁶ .............................. B60R 9/06; B60R 11/00
[52] U.S. Cl. .................... 224/488; 224/282; 224/502; 224/535; 224/536; 414/462
[58] Field of Search .................... 224/42.03 A, 42.03 R, 224/42.04, 42.07, 42.08, 42.25, 45.43, 315, 45.45 R; 293/117; 296/37.6, 37.8; 414/462; 248/316.3, 316.4, 316.5; 24/459, 460, 461, 489, 490, 492, 494, 495, 513

[56] References Cited

U.S. PATENT DOCUMENTS

| | | | |
|---|---|---|---|
| 1,336,472 | 4/1920 | Manning | 24/513 |
| 2,316,995 | 5/1941 | Smith . | |
| 2,478,814 | 7/1949 | Carmack et al. | 280/163 |
| 2,579,878 | 12/1951 | Stone | 248/316.4 |
| 2,668,645 | 2/1954 | Pease . | |
| 2,686,060 | 8/1954 | Couse | 280/30 |
| 3,105,666 | 10/1963 | Orr | 248/201 |
| 3,443,730 | 5/1969 | Meusel | 224/42.03 |
| 3,794,227 | 2/1974 | Stearns | 224/42.01 |
| 3,877,624 | 4/1975 | Carson | 224/42.1 |
| 4,113,270 | 9/1978 | Barecki | 280/179 R |
| 4,221,396 | 9/1980 | Kehl | 280/1 |
| 4,251,178 | 2/1981 | Bourgraf et al. | 414/462 |
| 4,586,687 | 5/1986 | Ziaylek, Jr. | 248/316.5 |
| 4,697,975 | 10/1987 | Lippold | 414/462 |
| 4,702,094 | 10/1987 | Peterson | 70/241 |
| 4,716,811 | 1/1988 | Johnson | 24/495 |
| 4,726,597 | 2/1988 | Hickin | 280/47.17 |
| 4,738,581 | 4/1988 | Kuhlman . | |
| 4,907,728 | 3/1990 | Giblet | 224/42.03 A |
| 4,971,341 | 11/1990 | Magnuson . | |
| 5,118,215 | 6/1992 | Freier | 248/316.5 |
| 5,209,628 | 5/1993 | Hassell | 414/462 |
| 5,236,342 | 8/1993 | Pellettier | 224/42.03 R |
| 5,328,066 | 7/1994 | Cappuccio et al. | 224/42.03 R |
| 5,338,146 | 8/1994 | Hindt | 224/42.45 R |
| 5,346,357 | 9/1994 | Hassell | 224/315 |
| 5,354,029 | 10/1994 | Ziaylek, Jr. et al. | 248/316.5 |

Primary Examiner—Henry J. Recla
Assistant Examiner—Gregory M. Vidovich
Attorney, Agent, or Firm—Seidel Gonda Lavorgna & Monaco

[57] ABSTRACT

An apparatus for detachably securing a hand truck having a base and a pair of side rails. The apparatus has a frame mounted to the vehicle. The frame has a pair of claws, each claw is pivotably mounted to the frame for rotatable movement between an open released position and a closed retained position. A bar is slideably carried by the frame for movement between a first position and a second position. The bar is slideably connected to the claws so that the claws pivot between the open/released position and the closed/retained position as the bar moves between the first position and the second position. The bar and claws are movable by movement of the hand truck. A latch secures the bar in the second position. A switch remote from the latch operates a release mechanism to release the latch.

18 Claims, 5 Drawing Sheets

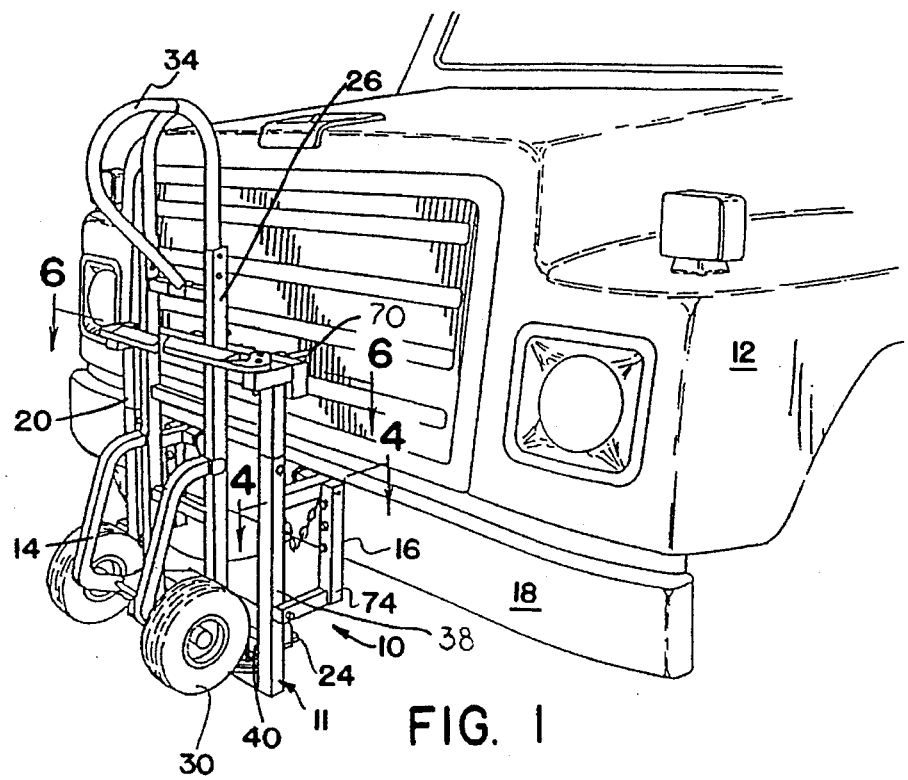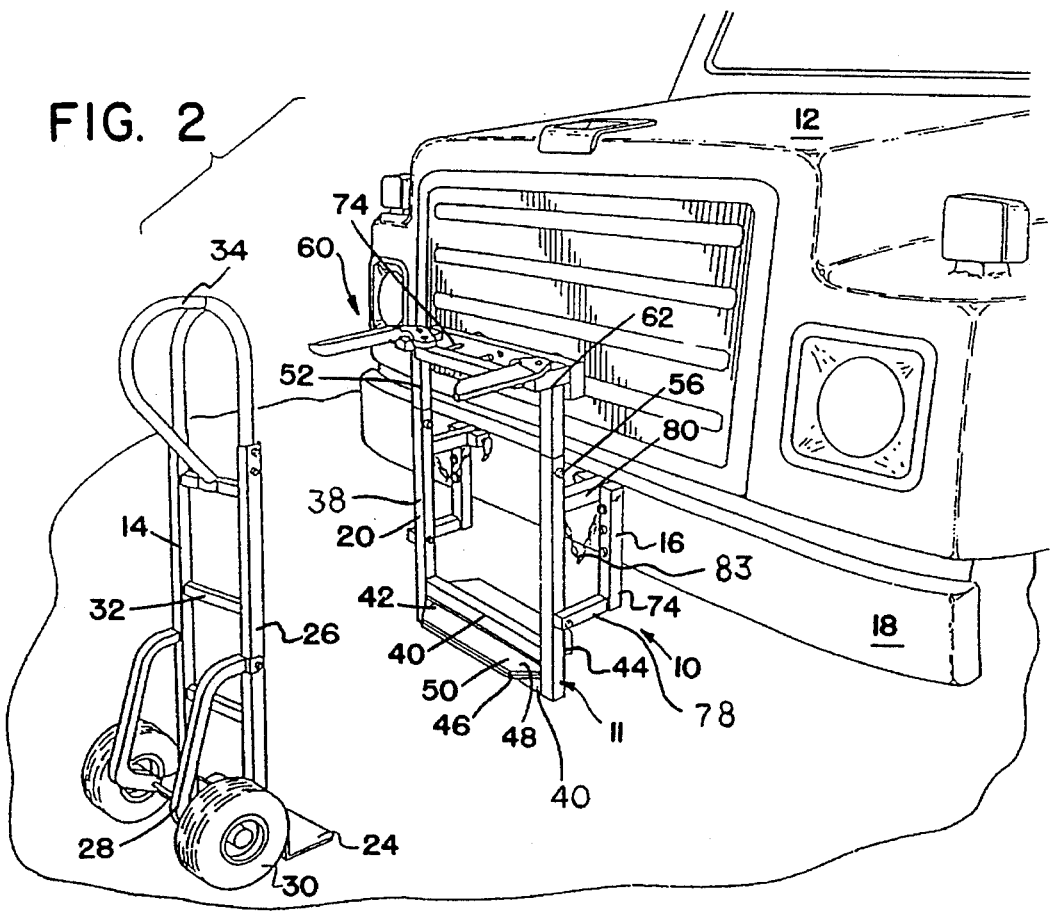

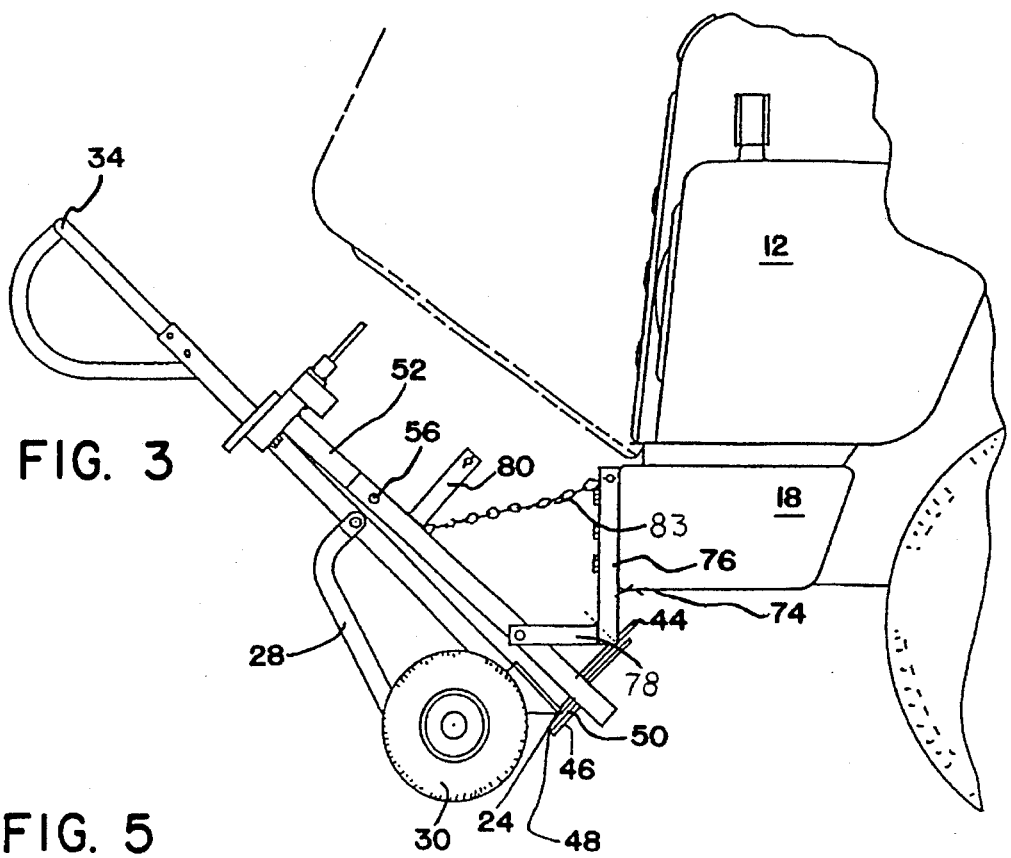
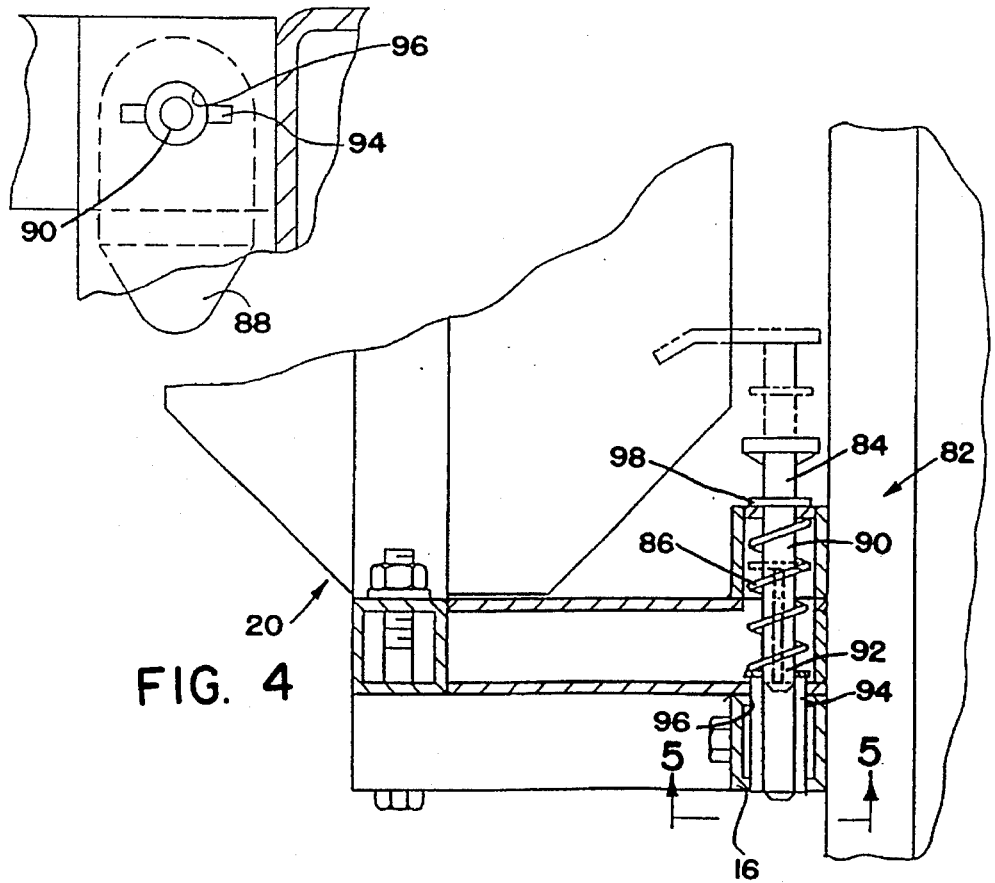

HAND TRUCK SENTRY SYSTEM

FIELD OF THE INVENTION

This invention relates to an apparatus for holding a hand truck to a vehicle and, more particularly, to an apparatus for securing a hand truck to a vehicle using a single motion such that once the hand truck is secured to the vehicle it can only be removed by being unlocked from the interior of the vehicle.

BACKGROUND OF THE INVENTION

Hand trucks are commonly used for moving heavy or bulky items. The typical hand truck has a platform or base plate for receiving the article to be moved, a pair of wheels for moving the hand truck, a pair of side rails for securing the articles to the hand truck and a handle on the end of the side rails opposite of the wheels and platform.

A typical use for a hand truck is in connection with a delivery truck to move packages or beverages in cans or bottles, such as beer or soft drinks. The delivery person may make up to sixty deliveries in one day and is required to secure the hand truck to the vehicle for movement to the next delivery site.

The hand truck could be placed inside the vehicle to move from location to location, but that solution poses problems. The hand truck would have to be loaded and unloaded from the vehicle at every stop, which can be cumbersome. Furthermore, the hand truck would take up valuable space inside the vehicle which could be used for items to be delivered. Finally, the hand truck still would need to be secured inside the truck to prevent movement during driving, resulting in both noise and possible damage to it and other items in the vehicle.

An alternative to placing the hand truck inside the vehicle is to place the hand truck on the outside of the vehicle. While not taking up valuable space, the placing of the hand truck outside the vehicle poses problems of its own. For example, the hand truck must be properly secured to prevent it from falling from the vehicle when the vehicle is moving and to prevent theft of the hand truck when the vehicle is stopped. It is common to secure the hand truck to the vehicle by bungee cords, rubber straps or padlock and chain. This method is generally not satisfactorily, especially in cold and wet weather.

U.S. Pat. No. 3,443,730 discloses an apparatus for releasably engaging a dolly or hand truck to a vehicle. The apparatus has a pair of pivoting engagement arms that engage the frame of the hand truck. Each arm engages one of the pair of side rails of the hand truck. The engagement arms include slots that surround the frame of the hand truck. The engagement arms pivot and work in connection with cradles located on the frame to secure the hand truck. The pivoting arms are normally retained in the closed position by means of a spring. A linkage mechanism releases the engagement arms when the hand truck is desired to be removed. A lock may be inserted through the latching arms and frames to lock the hand truck to the holder.

It is desired to have a hand truck security system that allows securing the hand truck to the vehicle with one hand, requires access to the interior of the vehicle to remove the hand truck and indicates when the hand truck is not properly secured.

SUMMARY OF THE INVENTION

The present invention is directed to an apparatus for detachably securing an article to a vehicle. The apparatus has a means for holding the article to the vehicle which is movable between an open/released position and a closed/retained position. The means for securing the article is movable between the position by movement of the article. Means for locking the securing means in a locked position is also provided. The apparatus also includes means for releasing the locking means.

In one embodiment, the apparatus detachably secures a hand truck having a base plate and a pair of side rails to a vehicle. The apparatus has a frame including a mounting portion for securing the apparatus to the vehicle and a hand truck receiving portion. The hand truck receiving portion is pivotably mounted to the mounting portion and the frame has a locking mechanism for securing the hand truck receiving portion in a normally-closed position relative to the mounting portion. The hand truck receiving portion has a slot for receiving the base plate of the hand truck and a hand truck retaining portion for receiving the side rails of the hand truck. The hand truck retaining portion also includes a pair of claws, each pivotably mounted to the frame for rotating between an open/released position and a closed/retained position. A bar is slideably carried by the frame for movement between a first position and a second position. The bar is slideably connected to the claws so that the claws move and pivot between the open position and the closed position as the bar moves between the first position and the second position. The bar and claws are movable between the positions by movement of the hand truck. A latch secures the bar in the second position. The apparatus also includes a solenoid for releasing the latch and a switch located remote from the solenoid. The apparatus has a signal for remotely indicating when the bar is not in the second secured position. The apparatus may also include an alarm for indicating when the bar is moved from the second secured position by an action other than the release of the latch.

DESCRIPTION OF THE DRAWINGS

For the purpose of illustrating the invention, there are shown in the drawings forms which are presently preferred; it being understood, however, that this invention is not limited to the precise arrangement and instrumentalities shown.

FIG. 1 is a perspective view of a vehicle having an apparatus of the present invention with the hand truck secured thereto;

FIG. 2 is a perspective view similar to FIG. 1 with the hand truck removed;

FIG. 3 is a side elevation showing the apparatus in a pivoted position;

FIG. 4 is a sectional view taken along line 4—4 of FIG. 1 and showing the securing pin;

FIG. 5 is a sectional view taken along line 5—5 of FIG. 4;

DESCRIPTION OF THE INVENTION

Figure 6:
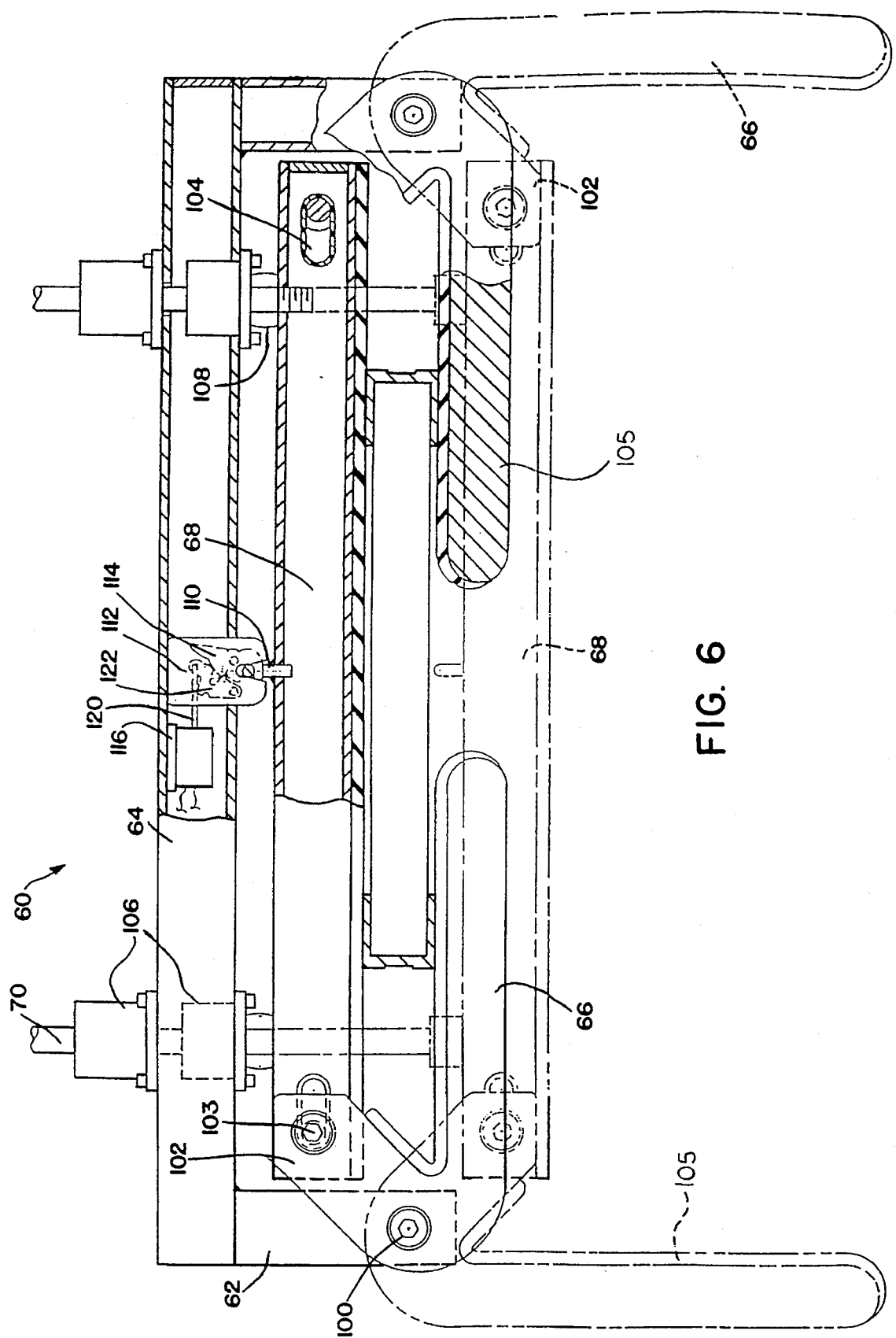
FIG. 6 is a sectional view taken along line 6—6 of FIG. 1 and showing the push bar in the closed position and the open position (shown in phantom)

Referring to the drawings in detail, wherein like numerals indicate like elements, there is illustrated an apparatus in accordance with the present invention designated generally at 10.

Referring to FIG. 1, the apparatus 10 has a frame 11 secured to a vehicle 12, such as a truck, for retaining a hand truck 14. The frame 10 has a mounting portion 16 for securing the frame 11 to the bumper 18 of the truck 12, and a hand truck receiving portion 20.

Referring to FIGS. 1 and 2, the hand truck 14 has a base plate 24 and a pair of side rails 26 extending upwardly from the base plate 24. The base plate 24 and side rails 26 receive an article or articles to be transported. The hand truck 14 has an axle bracket 28 mounted to each side rail 26 and a pair of wheels 30 located outwardly of the axle bracket 28. The hand truck 14 has a series of crossbars 32 extending between the side rails 26 and a tip-top-bar-handle 34 at the top of the side rails 26.

The hand truck receiving portion 20 of apparatus 10 has a pair of side frames 38 extending upwardly, generally parallel and spaced from each other. The hand truck receiving portion 20 has a pair of horizontal bars 40 extending between the side frames 38 in proximity to the frame's lower ends. The horizontal bars 40 define a slot 42 for receiving the base plate 24 of the hand truck 14. The hand truck receiving portion 20 further includes a pair of plates 44, 46 secured to the facing edge of horizontal bars 40. The lower plate 46 extends away from the truck 12 to create a surface 48 for placing the base plate 24 of the hand truck 14. The upper plate 44 extends toward the truck 12 (as best seen in FIG. 3) to limit rocking of the hand truck 14 prior to being secured thereto (as described below).

Each of the plates 44 and 46 has a replaceable plastic slide plate 50. The corner edges of the plates 44 and 46 and their slide plates 50 are tapered to eliminate right angle corners. The slide plate 50 eliminates metal to metal contact and provides for a smooth insertion and removal of the hand truck 14.

The hand truck receiving portion 20 also includes a pair of upper side frames 52. Each upper side frame 52 is slideably received by one of the side frames 38. The upper side frames 52 have a series of holes (not shown) for selectably receiving an adjustment bolt 56. Bolt 56 is provided for adjusting the total height of the hand truck receiving portion 20. The apparatus 10 is thus adaptable to various sizes of hand trucks 14 and capable of securing, as described below, various height hand trucks 14.

The hand truck receiving portion 20 has a hand truck retaining portion 60 located at the top of the upper side frames 52. The hand truck retaining portion 60 includes a pair of claw supports 62 located at the top of each of the upper side frames 52. The claw supports 62 run parallel to each other and towards and away from the vehicle 12. The hand truck retaining portion 20 has an upper support bar 64 extending between the claw supports 62. One of the functions of the upper support bar 64 is to stiffen the apparatus 10.

The hand truck retaining portion 60 also includes a pair of claws 66. Each claw 66 is pivotably mounted to one of the claw supports 62 for movement between a closed/retained position, as shown in FIG. 1, and an open/released position, as shown in FIG. 2. In addition, the hand truck retaining portion 60 has a push bar 68 slideably guided by a pair of guide post 70 which extend through the upper support bar 64.

The mounting portion 16 of the frame 11 has a pair of L-shaped legs 74. The vertical portion 76 of each of the L-shaped legs 74 is secured to the bumper 18 of the vehicle 12 preferably by a series of tamper-resistant fasteners. The hand truck receiving portion 20 of the frame 11 is pivotally mounted to the horizontal portion 78 of the L-shaped legs 74 for movement between a vertical position and a tilted position (as seen in FIG. 3). The mounting portion 16 has a horizontal bar 80 secured to each of the side frames 38. The horizontal bar 80 has a locking mechanism 82 for detachably engaging the vertical portion 76 of the L-shaped legs 74 to retain the hand truck receiving portion 20 in the vertical position.

Referring to FIG. 3, the hand truck receiving portion 20 is limited in the tilted position by a chain 83 extending between the side frame 38 in proximity to the horizontal bar 80 and the top of the vertical portion 76 of the L-shaped legs 74. The hand truck receiving portion 24 is tilted to allow opening of the hood of the vehicle 12. The hand truck 14 does not need to be removed to move the hand truck receiving portion 20 to this tilted position.

Referring to FIGS. 4 and 5, the locking mechanism 82 for locking the hand truck receiving portion 20 relative to the mounting portion 16 has a pin 84 biased by a compression spring 86 to a secured position. The pin 84, carried by the horizontal bar 80, has a handle 88 and a shaft 90. The shaft 90 has a cylindrical portion 92 and an alignment key 94 extending outward from the cylindrical portion 92. The vertical portion 76 of the L-shaped leg 74 has a hole 96 for receiving the shaft 90 of the pin 84. As seen best in FIG. 5, the hole 96 is complimentary shaped to the shaft 90 so that the shaft 90 only fits in the hole 96 when the alignment key 94 extends horizontally. The pin 84 has a cylindrical stop 98 around the shaft 90 to limit the movement of the pin 84 biased by the spring 86.

To rotate the hand truck receiving portion 20 to the tilted position of FIG. 3, the pin 84 is pulled using the handle 88 against the bias of spring 86 and rotated such that the alignment key 94 is out of alignment with the hole 94 in the L-shaped legs 74 and such that the pin 84 cannot enter hole 96.

Referring to FIG. 6 which shows the hand truck retaining portion 60, claws 66 are J-shaped and have a pivot 100 at the bend. Each claw 66 is mounted about pivot 100. The claw 66 has a short end 102 which is slideably guided by guide means, such as a post 103 received by a slot 104 in the push bar 68 and a longer hand truck engaging end 105. The push bar 68 is movable between a first/released position (shown in phantom) and a second/rearward engaged position. In a preferred embodiment, each of the guide posts 70 are mounted to the push bar 68 and guided by a pair of linear bearings 106. Mounted on each of the guide posts 70 is a rubber bumper 108 to limit the movement of the push bar 68 towards the upper support bar 64.

The push bar 68 has a striker 110 extending towards the upper support bar 64. The upper support bar 64 has a latch 112 extending toward the push bar 68 for securing the striker 110. The latch 112 is closed by the striker 110, engaging and rotating the fork bolt 114. The fork bolt 114 is held in this position by a lever 122 of the latch 112 which engages the fork bolt 114. Located in the upper support bar 64 in proximity to the latch 112 is a solenoid 116. A rod 120 extends from the solenoid 116 to the lever 122 for rotating the lever 122 out of engagement with the fork bolt 114. Upon rotation of the lever 122, a spring (not shown) rotates the fork bolt 114 to open the latch 112. Rotation of the fork bolt 114 moved the push bar 68 slightly further away from the upper support bar 64. It is recognized that other latch mechanism are possible, such as a post received by a latching solenoid.

Still referring to FIG. 6, upon the push bar 68 being unlatched from the upper support bar 64, the user can pull the hand truck 14 from the hand truck retaining portion 20. The side rails 26 of the hand truck 14 engage the end 105 of the claws 66 and rotate the claws 66 about the pivot 100. While the claws 66 are rotating, the post 103 of each claw 66 moves in their respective slots 104 first inwardly, and then outwardly moving the push bar 68 outward until the claws 66 and the push bar 68 are in the open/released position (shown in phantom). Both the push bar 68 and the claws 66 have a rubber protective strip for engaging the hand truck 14 to eliminate metal-to-metal contact and eliminating excess vibration.

Figure 7:
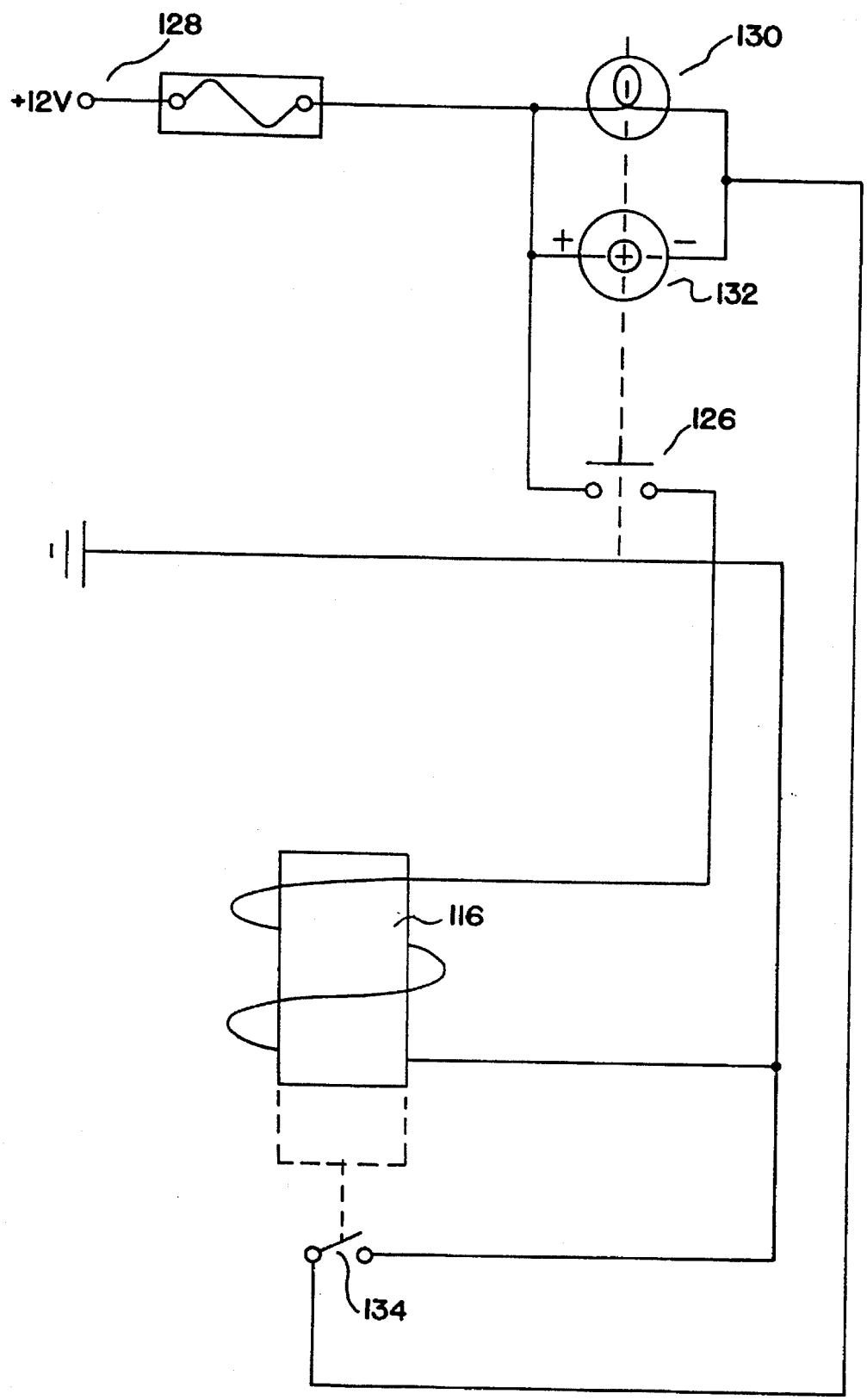
FIG. 7 is a schematic of an electrical circuit.

FIG. 7 shows a schematic of operating the solenoid 116, as shown in FIG. 6. The solenoid 116 is connected to a normally open switch 126 which is powered by the 12 volt source 128 in the vehicle 12 when the ignition is on. The switch 126 is located in the interior or cab of the vehicle 12. The user pushes the switch 126 to close the contact, to power the solenoid 116, and to open the latch 112. In addition, the apparatus 10 has a lamp 130 and a buzzer 132 in parallel which are similarly powered by the 12 volt source 128 when the ignition is on in the vehicle 12. The lamp 130 and buzzer 132 are also located in the cab of the vehicle. The light 130 and buzzer 132 are connected to a limit switch 134 which is closed when the latch 112 is open. The light 130 and buzzer 132, therefore, are on when the vehicle 12 is running and when the latch is not closed. This ensures that the driver/user does not leave the hand truck 14 and drive off. The circuits each have in-line fuses.

Figure 8:
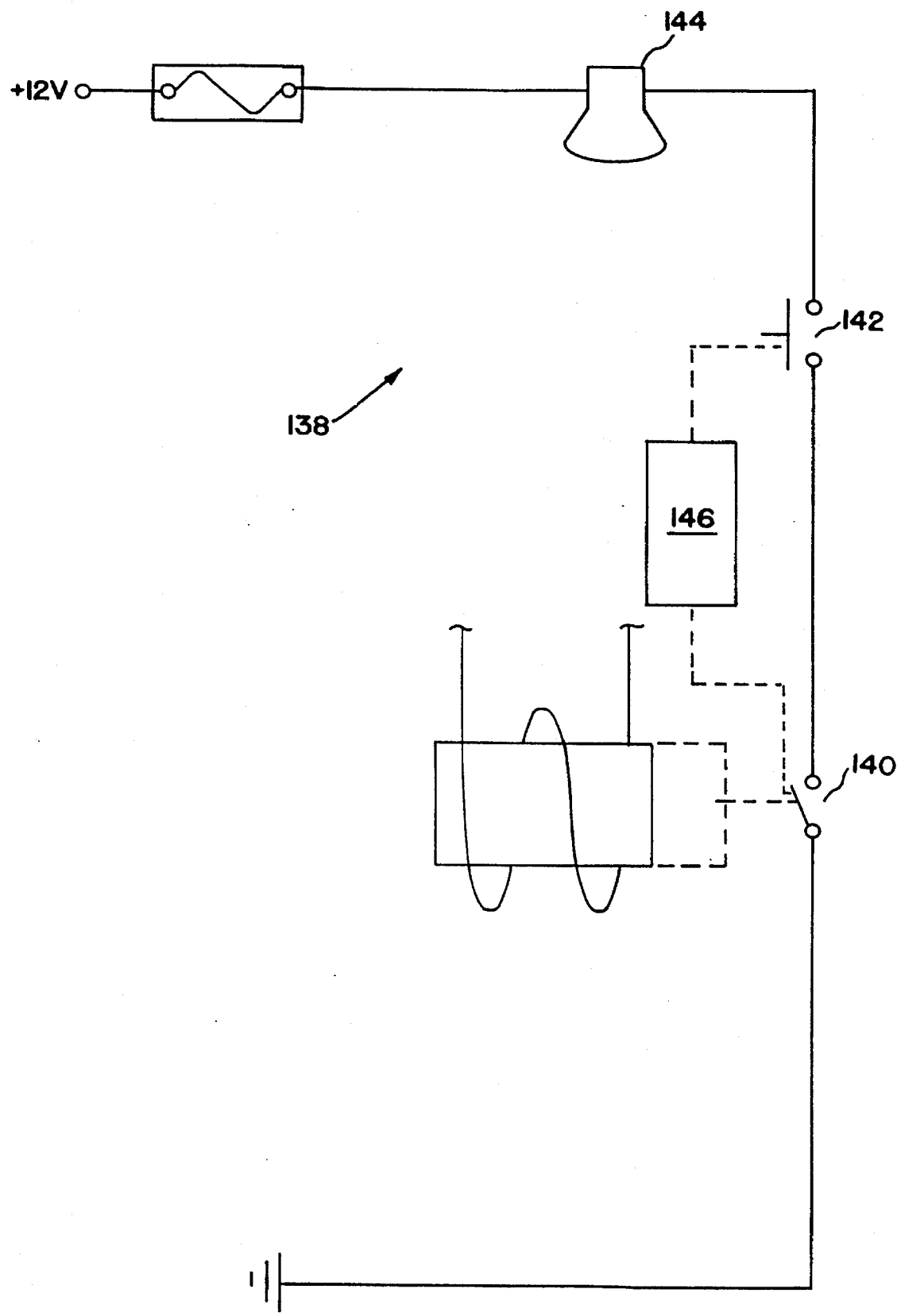
FIG. 8 is a schematic of an alarm circuit.

Referring to FIG. 8, the apparatus 10 has a second alarm system 138 having a limit switch 140 similar to the first limit switch 134 which is closed when the latch 112 is open. The second alarm system 138 has a third limit switch 142 which is normally closed. The alarm system 138 is connected to the horn 144 of the vehicle 12. The limit switch 142 is held open when the vehicle 12 is running; i.e., when the ignition is on. A relay latching means, represented by a box 146, retains the limit switch 142 in the open position if the limit switch 140 is closed by opening the latch 112. If someone tries to remove the hand truck when the vehicle is not running by forcing the hand truck 114 out of the claws 62, the horn 144 will sound. The horn 144 sounds because the latch 112 will be forced open therein closing the limit switch 140 and the circuit of the second alarm system 138. However, if the hand truck is properly disengaged prior to turning the vehicle ignition off, the limit switch 142 will remain open. The relay latching means 146 holds the limit switch 142 open even after the ignition is turned off, if the latch 112 is already open. It is recognized that the limit switch 140 could also be placed to detect movement of the claws 66.

The user, upon arriving at the desired location, pushes the switch 126 in the vehicle prior to turning the vehicle off. The switch 126, in turn, releases the latch by means of the solenoid pulling the rod to pull the lever 122. Upon turning the vehicle off, the user exits the vehicle and grabs the two side rails 26 of the hand truck 14 and pulls the hand truck away from the hand truck receiving portion 20 of the apparatus 10. The push bar 68 which is released from the latch 112 is guided by the guide post 70 as the claws 66 are pulled by the hand truck 14. As the push bar 68 is pulled in relation to the claw supports 62, the claws 60 rotate from the closed/retained position of FIG. 1 to the open/released position of FIG. 2. The base plate 24 simply slides between the lower plate 44 and upper plate 46 in the slot 42.

Upon completing use of the hand truck 14, it can be positioned such that the base plate 24 slips into the slot 42 between the plates 44 and 46 of the apparatus 10. The hand truck 14 is pushed until it engages the push bar 68, pushing the push bar 68 towards the upper support bar 64 therein, and causing the claws 66 to rotate. Upon the push bar 68 being moved in proximity to the upper support bar 64, the striker 110 engages the latch 112, securing the hand truck 14 in its proper position.

The present invention may be embodied in other specific forms without departing from the spirit or essential attributes thereof and, accordingly, reference should be made to the appended claims, rather than to the foregoing specification, as indicating the scope of the invention. It is recognized that a pneumatic or hydraulic system could be used to operate the latch. It is also recognized that the frame 11 of the apparatus 10 could be secured to other structures such as a warehouse wall.

We claim:

1. An apparatus for detachably securing a hand truck to a structure, the hand truck being of the type having a base and a pair of side rails, the apparatus comprising:

holding means for holding the article, the holding means adapted to be mounted to the structure the holding means having a surface for receiving the base of the hand truck;

a pair of claws, the claws each pivotably mounted to the holding means for pure rotatable movement between an open released position and a closed retained position for securing the pair of side rails of the hand truck;

a bar slideably mounted to the holding means for sliding movement between a first position and a second position, the bar slideably connected to the claws, the claws pivot between the open released position and the closed retained position as the bar moves between the first position and the second position, respectively, the claws movable from the open released position to the closed retained position upon the pair of side rails engaging the bar and from the closed retained position to the open released position by movement of the pair of rails into engagement with the claws;

locking means for securing the bar in the second position thereby securing the pair of rails between the claws and the bar; and releasing means for releasing the locking means and allowing movement of the bar.

2. An apparatus for detachably securing a hand truck to a structure as in claim 1, wherein the releasing means has a switch located remote from the claws and the bar.

3. An apparatus for detachably securing a hand truck to a vehicle, the hand truck being of the type typically having a base and a pair of side rails, the apparatus comprising:

a frame adapted to be mounted to the vehicle the frame has an opening for receiving the base of the hand truck;

a pair of claws, the claws each pivotably mounted to the frame for pure rotatable movement between an open released position for securing the article and a closed retained position;

a bar slideably mounted to the frame for slideable movement between a first position and a second position, the bar slideably connected to the claws so that the claws move and pivot between the open released position and the closed retained position as the bar moves between the first position and the second position respectively, the claws movable from the open released position to the closed retained position upon the hand truck engaging the bar and from the closed retained position to the open released position upon movement of the hand truck into engagement with the claws;

locking means for securing the bar in the second position thereby securing the hand truck between the claws and the bar; and releasing means for releasing the locking means and allowing movement of the bar.

4. An apparatus for detachably securing a hand truck to a vehicle as in claim 3, wherein the releasing means has a switch located remote from the claws and the bar.

5. An apparatus for detachably securing a hand truck to a vehicle as in claim 4, wherein the frame has a mounting portion for securing to the vehicle and a hand truck receiving portion, the hand truck receiving portion is pivotably mounted to the mounting portion, and the frame has an anti-pivot securing means for securing the hand truck receiving portion in a normal upright position relative to the mounting portion.

6. An apparatus for detachably securing a hand truck to a vehicle, the hand truck being of the type typically having a base and a pair of side rails, the apparatus comprising:

a frame adapted to be mounted to the vehicle, the frame having an opening for receiving the base of the hand truck;

a pair of claws, the claws each pivotably mounted to the frame for rotatable movement between an open released position for securing the article and a closed retained position;

a bar slideably mounted to the frame for slideable movement between a first position and a second position, the bar slideably connected to the claws so that the claws move and pivot between the open released position and the closed retained position as the bar moves between the first position and the second position respectively, the claws movable from the open released position to the closed retained position upon the hand truck engaging the bar and from the closed retained position to the open released position upon movement of the hand truck into engagement with the claws;

locking means for securing the bar in the second position thereby securing the hand truck between the claws and the bar;

releasing means for releasing the locking means and allowing movement of the bar, the releasing means having a switch located remote from the claws and the bar; and an electro-mechanical signal means for remotely indicating when the bar is not in the second secured position.

7. An apparatus for detachably securing a hand truck to a vehicle as in claim 6, further comprising a second electro-mechanical signal means for indicating when the bar is moved from the second secured position by means other than the releasing means.

8. An apparatus for detachably securing a hand truck to a vehicle, the hand truck having a base plate and a pair of side rails, the apparatus comprising:

a frame having a mounting portion for securing to the vehicle and a hand truck receiving portion;

the hand truck receiving portion having a slot for receiving the base plate of the hand truck and a hand truck retaining portion for receiving the side rails of the hand truck;

the hand truck retaining portion having a pair of claws, the claws each pivotably mounted to the frame for pure pivotable rotation between an open released position for securing the hand truck and a closed retained position, a bar slideably mounted to the frame for slideable movement between a first position and a second position, the bar has a pair of slots, each of the claws has a guide means slideably received by one of the slots for slideably connecting the claws to the bar so that the claws move and pivot between the open released position and the closed retained position as the bar moves between the first position and the second position respectively, the claws movable from the open released position to the closed retained position upon the hand truck engaging the bar, and from the closed retained position to the open released position movement of the hand truck into engagement with the claws, and locking means for securing the bar in the second position securing the hand truck between the claws and the bar; and the apparatus having release means for releasing the locking means allowing movement of the bar.

9. An apparatus for detachably securing a hand truck to a vehicle as in claim 8, wherein the releasing means has a switch located remote from the claws and the bar.

10. An apparatus for detachably securing a hand truck to a vehicle as in claim 9, wherein the hand truck receiving portion is pivotably mounted to the mounting portion and the frame has an anti-pivot securing means for securing the hand truck receiving portion in a normal upright position relative to the mounting portion.

11. An apparatus for detachably securing a hand truck to a vehicle as in claim 8, wherein the bar has a pair of slots and the claws each having a post slideably located in one of the slots of the bar and the post moving in one direction and then the other direction in the slot as the claw pivots about the frame from the closed retained position to the open released position.

12. An apparatus for detachably securing a hand truck to a vehicle, the hand truck having a base plate and a pair of side rails, the apparatus comprising:

a frame having a mounting portion for securing to the vehicle and a hand truck receiving portion;

the hand truck receiving portion having a slot for receiving the base plate of the hand truck and a hand truck retaining portion for receiving the side rails of the hand truck;

the hand truck retaining portion having a pair of claws, the claws each pivotably mounted to the frame for rotation between an open released position and a closed retained position for securing the hand truck, a bar slideably mounted to the frame for slideable movement between a first position and a second position, the bar slideably connected to the claws so that the claws move and pivot between the open released position and the closed retained position as the bar moves between the first position and the second position respectively, the claws movable from the open released position to the closed retained position upon the hand truck engaging the bar and from the closed retained position to the open released position by movement of the hand truck into engagement with claws, and locking means for securing the bar in the second position securing the hand truck between the claws and the bar, the hand truck receiving portion pivotably mounted to the mounting portion and the frame has an anti-pivot securing means for securing the hand truck receiving portion in a normal upright position relative to the mounting portion, the anti-pivot securing means has a pin having a shaft and an alignment key, the alignment key aligned with a hole in a secured position and not aligned with the hole in a non-secured position, and the pin is biased by a spring to the secured position; and releasing means for releasing the locking means and allowing movement of the bar, the releasing means having a switch located remote from the claws and the bar.

13. An apparatus for detachably securing a hand truck to a vehicle, the hand truck having a base plate and a pair of side rails, the apparatus comprising:

a frame having a mounting portion for securing to the vehicle and a hand truck receiving portion;

the hand truck receiving portion having a slot for receiving the base plate of the hand truck and a hand truck retaining portion for receiving the side rails of the hand truck;

the hand truck retaining portion having a pair of claws, the claws each pivotably mounted to the frame for rotation between an open released position for securing the hand truck and a closed retained position, a bar slideably mounted to the frame for slideable movement between a first position and a second position, the bar slideably connected to the claws so that the claws move and pivot between the open released position and the closed retained position as the bar moves between the first position and the second position respectively, the claws movable from the open released position to the closed retained position Upon the hand truck engaging the bar, and from the closed retained position to the open released position upon movement of the hand truck into engagement with the claws, and locking means for securing the bar in the second position securing the hand truck between the claws and the bar;

the apparatus having release means for releasing the locking means allowing movement of the bar, the releasing means having a switch located remote from the claws and the bar; and an electro-mechanical signal means for remotely indicating when the bar is not in the second secured position.

14. An apparatus for detachably securing a hand truck to a vehicle as in claim 13, further comprising a second electro-mechanical signal means for indicating when the bar is moved from the second secured position by means other than the releasing means.

15. An apparatus for detachably securing a hand truck to a vehicle, the hand truck having a base plate and a pair of side rails, the apparatus comprising:

a frame having a mounting portion or securing to the vehicle and a hand truck receiving portion;

the hand truck receiving portion having a slot for receiving the base plate of the hand truck and a hand truck retaining portion for receiving the side rails of the hand truck;

the hand truck retaining portion having a pair of claws, the claws each pivotably mounted to the frame for pure pivotable rotation between an open released position for securing the hand truck and a closed retained position, a bar slideably mounted to the frame for slideable movement between a first position and a second position, the bar slideably connected to the claws so that the claws move and pivot between the open released position and the closed retained position as the bar moves between the first position and the second position respectively, the claws movable from the open released position to the closed retained position upon the hand truck engaging the bar and from the closed retained position to the open released position upon movement of the hand truck into engagement with the claws, and locking means for securing the bar in the second position securing the hand truck between the claws and the bar the hand truck receiving portion adjustable for adjusting the distance between the slot and the hand truck retaining portion; and releasing means for releasing the locking means and allowing movement of the bar.

16. A method for detachably securing a hand truck to a vehicle, the hand truck being of the type typically having a base and a pair of side rails comprising the steps of:

placing the hand truck in a frame having an opening for receiving the base of the hand truck;

pushing the hand truck into engagement with a bar therein moving the bar from a first position towards a second position engaging the frame;

rotating in pure pivotable motion a pair of claws pivotably mounted to the frame and guided by the movement of the bar from the first position to the second position for securing the hand truck;

securing the bar in engagement with the frame therein securing the hand truck between the bar and the claws; and detaching the bar from engagement with the frame;

pulling the hand truck from the frame therein rotating the claws and moving the bar to the first position releasing the hand truck from between the bar and the claws.

17. A method for detachably securing a hand truck to a vehicle, the hand truck being of the type typically having a base and a pair of side rails comprising the steps of:

placing the hand truck in a frame having an opening for receiving the base of the hand truck;

pushing the hand truck into engagement with a bar therein moving the bar from a first position towards a second position;

rotating a pair of claws pivotably mounted to the frame and guided by the movement of the bar from the first position to the second position for securing the hand truck;

securing the bar in engagement with the frame therein securing the hand truck between the bar and the claws; and detaching the bar from engagement with the frame by operating a remote switch to activate a solenoid associated with a latch securing the bar;

pulling the hand truck from the frame therein rotating the claws and moving the bar to the first position releasing the hand truck from between the bar and the claws.

18. An apparatus for detachably securing a hand truck to a vehicle the hand truck having a base plate and a pair of side rails, the apparatus comprising:

a frame having a mounting portion for securing to the vehicle and a hand truck receiving portion;

the hand truck receiving portion having a slot for receiving the base plate of the hand truck and a hand truck retaining portion for receiving the side rails of the hand truck;

the hand truck retaining portion having a pair of claws, the claws each pivotably mounted to the frame for rotation between an open released position for securing the hand truck and a closed retained position, a bar slideably mounted to the frame for slideable movement between a first position and a second position, the bar slideably connected to the claws so that the claws move and pivot between the open released position and the closed retained position as the bar moves between the first position and the second position respectively, the claws being movable from the open released position to the closed retained position upon the hand truck engaging the bar, and from the closed retained position to the open released position upon movement of the hand truck into engagement with the claws, and locking means for securing the bar in the second position securing the hand truck between the claws and the bar, the hand truck receiving portion pivotably mounted to the mounting portion, the frame having an anti-pivot securing means for securing the hand truck receiving portion in a normally upright position relative to the mounting portion, the anti-pivot securing means having a shaft and an alignment key, the alignment key being aligned with a hole in a secured position and not being aligned with the hole in a non-secured position, and the shaft being biased by a spring to the secured position; and releasing means for releasing the locking means and allowing movement of the bar.

* * * * *